United States Patent
Louks et al.

(10) Patent No.: US 8,508,598 B2
(45) Date of Patent: Aug. 13, 2013

(54) METHOD AND APPARATUS FOR TRANSFERRING IMAGES FROM AN IMAGING DEVICE TO A REMOTE DEVICE

(75) Inventors: Ronald A. Louks, Durham, NC (US); Nadi Sakir Findikli, Cary, NC (US); Gerard James Hayes, Wake Forest, NC (US)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1332 days.

(21) Appl. No.: 11/750,358

(22) Filed: May 18, 2007

(65) Prior Publication Data

US 2008/0102892 A1      May 1, 2008

Related U.S. Application Data

(60) Provisional application No. 60/863,382, filed on Oct. 29, 2006.

(51) Int. Cl.
*H04N 5/225* (2006.01)
*H04B 1/38* (2006.01)

(52) U.S. Cl.
USPC ........................................ 348/207.2; 455/557

(58) Field of Classification Search
USPC ........................................ 348/207.2, 211.2
See application file for complete search history.

(56) References Cited

U.S. PATENT DOCUMENTS

| | | | |
|---|---|---|---|
| 6,049,705 A | 4/2000 | Xue | |
| 6,670,982 B2 * | 12/2003 | Clough et al. | 348/14.02 |
| 6,954,229 B1 | 10/2005 | Otala | |
| 2003/0074529 A1 | 4/2003 | Crohas | |
| 2003/0090572 A1 | 5/2003 | Belz et al. | |
| 2003/0117638 A1 | 6/2003 | Ferlitsch | |

(Continued)

FOREIGN PATENT DOCUMENTS

| CN | 1205824 A | 1/1999 |
|---|---|---|
| EP | 1001348 | 5/2000 |

(Continued)

OTHER PUBLICATIONS

Agarwal, A. "Convert PDF without Adobe Acrobat PDF Writer." Internet article dated Jul. 5, 2005, Available at: http://labnol.blogspot.com/2005/07/convert-pdf-without-adobe-acrobat-pdf.html. XP001152070.

(Continued)

*Primary Examiner* — Albert Cutler
(74) *Attorney, Agent, or Firm* — Coats & Bennett, P.L.L.C.

(57) ABSTRACT

A wireless adapter enables a camera or other digital camera without inherent networking capability to post or send images to a remote destination. The wireless adaptor comprises a wireless interface for communicating with a remote destination over a wireless network, a camera interface to interface the wireless adaptor to a camera, and a file transfer agent. The file transfer agent uses the wireless interface to transfer the image data received from the digital camera to a destination device. In at least one embodiment, the file transfer agent emulates one or more printers, with each emulated printer corresponding to a different destination. With that configuration, the wireless adaptor transfers image data received from the digital camera to a selected destination based on which emulated printer is selected by the digital camera. Destination parameters for multiple destinations can be loaded and stored in the wireless adaptor.

22 Claims, 7 Drawing Sheets

(56) References Cited

U.S. PATENT DOCUMENTS

| | | | |
|---|---|---|---|
| 2003/0137683 A1* | 7/2003 | Mochizuki et al. | 358/1.13 |
| 2003/0200361 A1 | 10/2003 | Dogra et al. | |
| 2004/0100648 A1 | 5/2004 | Kulakowski | |
| 2004/0201680 A1 | 10/2004 | Gennetten et al. | |
| 2004/0239772 A1* | 12/2004 | Onishi et al. | 348/211.2 |
| 2005/0036034 A1* | 2/2005 | Rea et al. | 348/207.1 |
| 2005/0064825 A1 | 3/2005 | Forrester | |
| 2005/0078195 A1* | 4/2005 | VanWagner | 348/231.3 |
| 2005/0286091 A1 | 12/2005 | Harel et al. | |
| 2006/0017822 A1* | 1/2006 | Eckl | 348/231.7 |
| 2006/0073848 A1 | 4/2006 | Kwon | |
| 2006/0093340 A1 | 5/2006 | Yamaki | |
| 2006/0176506 A1 | 8/2006 | Lin et al. | |
| 2006/0195162 A1 | 8/2006 | Arx et al. | |
| 2007/0030517 A1* | 2/2007 | Narayanan | 358/1.15 |
| 2007/0285513 A1* | 12/2007 | Arnold | 348/150 |
| 2008/0100718 A1 | 5/2008 | Louks et al. | |

FOREIGN PATENT DOCUMENTS

| | | | |
|---|---|---|---|
| EP | 1630726 | | 3/2006 |
| EP | 1681772 A1 | | 7/2006 |
| GB | 2388942 | * | 11/2003 |
| GB | 2415863 A | | 1/2006 |
| JP | 2006163463 | | 6/2006 |
| WO | WO03088021 | | 10/2003 |
| WO | 2006/029148 A1 | | 3/2006 |

OTHER PUBLICATIONS

Author Unknown. "Products—Print2Email Printer Drivers." Black Ice Software Inc. Internet article dated Jul. 1, 2001. XP001152071.

International Search Report w/ Written Opinion, International Application No. PCT/US2007/074416, Mailing date: Nov. 23, 2007.

CN Search Report issued Sep. 26, 2012 in re CN Application No. 200780048801.3 filed Jun. 29, 2009.

* cited by examiner

METHOD AND APPARATUS FOR TRANSFERRING IMAGES FROM AN IMAGING DEVICE TO A REMOTE DEVICE

RELATED APPLICATIONS

This application claims the benefit of U.S. Provisional Patent Application 60/863,382 filed Oct. 29, 2006, which is incorporated herein by reference.

BACKGROUND

The present invention relates generally to digital cameras and, more particularly to wireless adapters for digital cameras that enable digital cameras to communicate with remote devices.

A digital camera is an electronic device for capturing and storing images electronically instead of on photographic film. Modern digital cameras have many advantages over conventional film cameras and have virtually replaced film cameras in the marketplace. Digital cameras are small, lightweight, and inexpensive to operate since no film is required. Digital cameras allow consumers to view images immediately after they are captured. Consumers can delete images they do not like and retake images. Captured images can be uploaded to photo libraries on the user's home computer or imported into photo-editing software.

Digital cameras typically include a USB or FIREWIRE port for connecting the digital camera to the user's home computer. A cable plugs into the camera at one end and the computer at the other end. There are many circumstances in which a user may want to send images wirelessly to remote devices. Because many home computers now have wireless interfaces, it would be convenient for consumers to connect to home computers using a wireless interface. Further, long range wireless interfaces would enable users of digital cameras to access remote devices and services from whatever location the user may currently be in.

To date, wireless interfaces have not been used in digital cameras for several reasons. Wireless interfaces increase the size, weight, and cost of the digital camera. Further, the interfaces available in most digital cameras do not provide sufficient power to a wireless transceiver. These design challenges have so far prevented use of wireless interfaces in small, portable digital cameras.

SUMMARY

The present invention provides a wireless adapter that enables a camera or other imaging device to post or send images to a remote destination. In one or more embodiments, the wireless adaptor comprises a wireless interface for communicating with a remote destination over a wireless network, a camera interface to interface the wireless adaptor to a camera, and a file transfer agent configured to transfer image data from the camera to one or more remote destinations.

More particularly, in at least one embodiment, a wireless adaptor for a digital camera comprises a camera interface configured to interface the wireless adaptor to a digital camera, a wireless interface configured to interface the wireless adaptor to a wireless communication network, and a file transfer agent configured to transfer image data received from the camera interface to a destination device accessible through the wireless communication network. In at least one such embodiment, the file transfer agent emulates a printer and associates the emulated printer with the destination device, such that the wireless adaptor receives image data from the digital camera responsive to the digital camera printing to the emulated printer.

Further, in at least one such embodiment, the file transfer agent is configured to transfer the image data to the destination device according to destination parameters stored in a memory circuit included in the wireless adaptor. The wireless adaptor includes a configuration interface for receiving the destination parameters. In one embodiment, the configuration interface is separate from the camera interface and comprises, for example, a PC-compatible interface (e.g., USB, etc.) that allows the wireless adaptor to be configured from an external computer. In other embodiments, the camera interface also functions as the configuration interface, although it does not necessarily support the simultaneous connection of a digital camera and an external computing device for configuration activities. In another embodiment, the wireless interface functions as the configuration interface. The wireless adaptor includes non-volatile or other memory circuits to receive and store the destination parameters for one or more destinations.

The destination parameters for a given destination at least identify the destination, and thus may include destination name and/or (network) address information. The destination parameters also may include user information that identifies or otherwise authenticates a user of the wireless adaptor to a destination device. Such information may comprise, for example, user name and account information, such as login information and passwords, and may further include public encryption keys, etc. The destination parameter information also may include preference information identifying processing or other actions to be taken by the wireless adaptor or by a destination device. In general, the destination parameters should be understood as comprising any and all such information needed to transfer image data to a corresponding destination. Thus, the destination parameters stored for one destination may differ from those stored for another destination.

In one or more embodiments of the wireless adaptor, the file transfer agent emulates a printer for each destination, such that the wireless adaptor transfers image data received from the digital camera to a targeted destination responsive to the digital camera printing to the corresponding emulated printer. In this manner, the wireless adaptor represents multiple destinations, such as a remotely hosted blog or web photo album, as different emulated printers. Image data is thus transferred from the digital camera to a desired destination by selecting and "printing" to the corresponding emulated printer. As a non-limiting example, the file transfer agent may be configured as a PictBridgec® compatible device, or as another type of direct print device.

Of course, the present invention is not limited to the above features and advantages. Indeed, those skilled in the art will recognize additional features and advantages upon reading the following discussion and viewing the accompanying figures.

DETAILED DESCRIPTION

Figure 1:
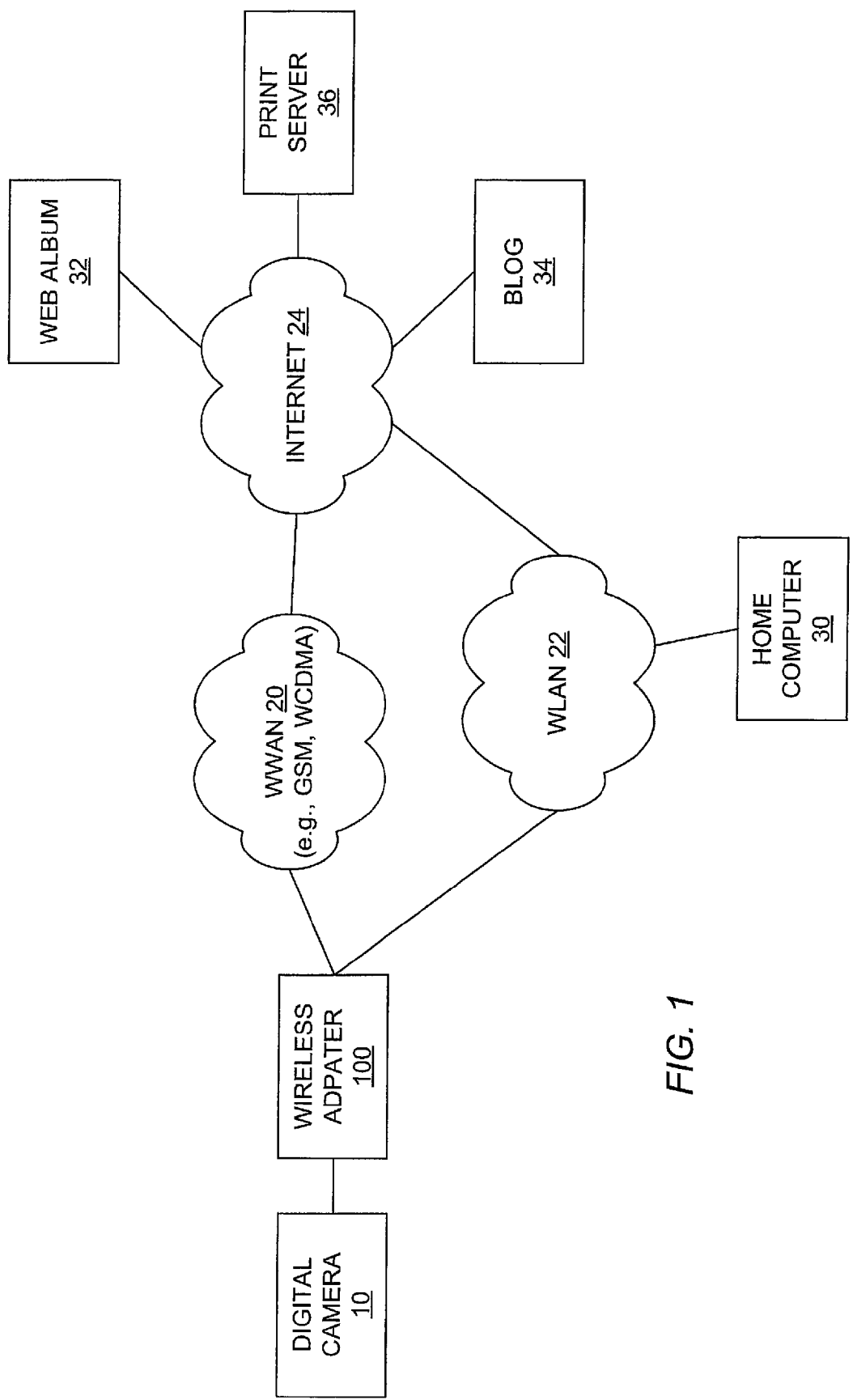
FIG. 1 is a block diagram illustrating an exemplary networking environment suitable for use by one embodiment of the present invention.

The present invention provides a wireless adapter 100 for transferring data over a wireless network from a digital camera 10 to remote destinations, such as a home computer 30, web album 32, web blog 34, or print server 36. The wireless adapter can be used with both digital video cameras and digital still cameras. The wireless adapter 100 connects to the digital camera 10 and provides remote access capability to the digital camera 10.

FIG. 1 shows an exemplary networking environment in which the wireless adapter 100 may be used. As will be described in greater detail below, the wireless adapter 100 may connect to a wireless wide area network (WWAN) 20, such as a cellular network or WiMAX network, or to a wireless local area network (WLAN) 22. The WLAN 22 comprises any local area network that can be accessed wirelessly, such as a home network with a wireless router. The WWAN 20 and/or WLAN 22 may provide connection to the Internet 24. A home computer 30 is connected to the WLAN 22. Web album 32, web blog 34, and print server 36 are connected to the Internet 24.

Figure 2:
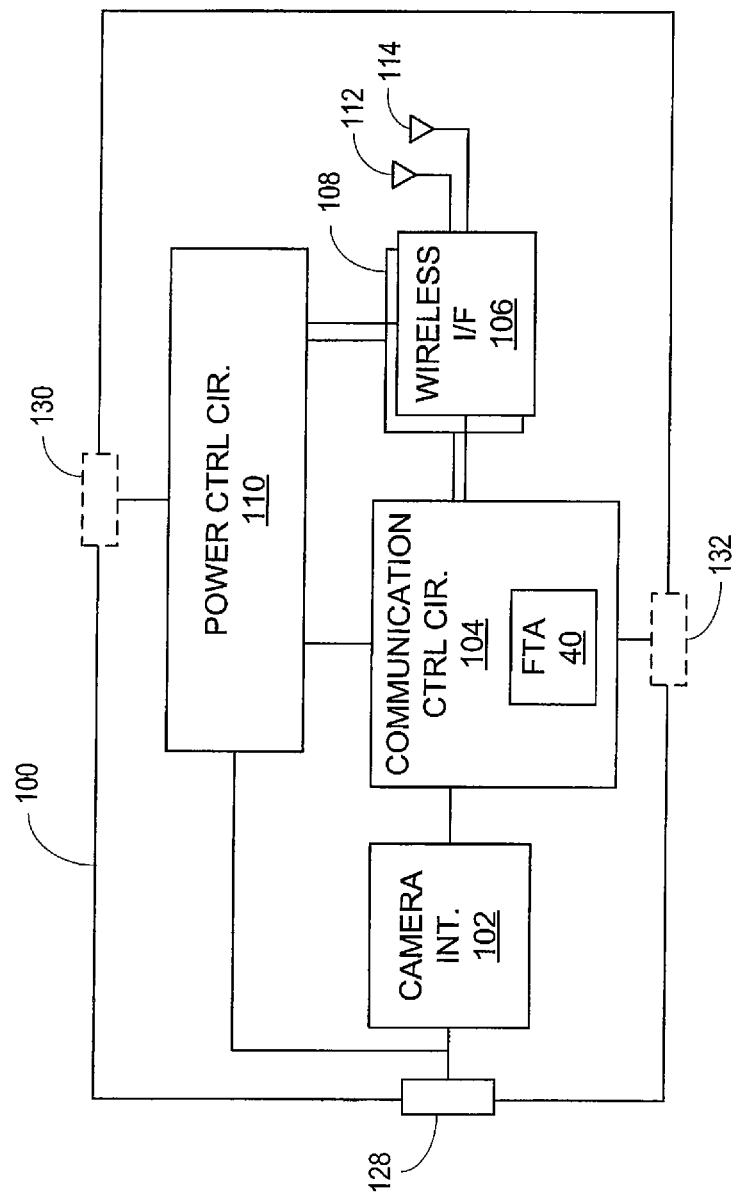
FIG. 2 is a block diagram illustrating some of the functional components of a wireless adaptor according to one embodiment of the present invention.

FIG. 2 shows an exemplary wireless adaptor 100. Wireless adaptor 100 includes camera interface 102, communication control circuit 104, wireless interfaces 106, 108, and power control circuit 110. Camera interface 102 provides an interface to the digital camera 10 to enable communication between the wireless adapter 100 and digital camera 10. Communication control circuit 104 comprises processing circuits and memory for implementing file transfer agent functions and controlling the overall operation of the wireless adapter as herein after described. Wireless interfaces 106, 108 enable communication over wireless network, such as WWAN 20 and WLAN 22 via antenna 112, 1124. Power control circuit 110 manages power to the wireless adapter 100. Power can be supplied by camera 10, an internal battery (not shown), or an external power source via an optional connector 130.

Camera interface 102 may comprise a serial or parallel interface, such as a Universal Serial Bus (USB) interface, a FIREWIRE interface, etc. Connector 128 connects the camera interface 102 with the digital camera 10. In one exemplary embodiment, the camera interface 102 functions as a USB host device and the digital camera 10 functions as a USB client device. Power can also be supplied by the digital camera 10 through the camera interface 102.

In one exemplary embodiment, wireless interface 106 enables long-range communication over a WWAN 20, while wireless interface 108 enables short-range wireless communication over WLAN 22. The wireless interface 106 may comprise a standard cellular transceiver, such as a GSM or CDMA transceiver, or could be a WIMAX transceiver or OFDM transceiver. Wireless interface 108 may comprise, for example, a BLUETOOTH, WiFi, RFID, or NFC interface. Power control circuit 110 performs power management functions.

The communication control circuit 104 includes a file transfer agent (FTA) 40 that provides remote access capability for a digital camera 10 lacking wireless networking capability. The file transfer agent 40 stores information about one or more remote destinations 30, 32, 34, 36 in memory of the wireless adapter 100. Such information includes the destination address for each destination and authentication information, such as the username and password for each destination. The file transfer agent 40 is configured to receive image data from the digital camera 10 and to transfer the image data to the remote destination via one of the wireless interfaces 106, 108 in accordance with stored destination parameters. An optional configuration connector 132 can be provided for connecting the communication control circuit 104 to an external computer (not shown) to configure the wireless adaptor 100.

In at least one embodiment, the file transfer agent 40 functions as a printer emulator. Thus, when the digital camera "prints" to the wireless adapter 100, the wireless adapter 100 sends the image data to the remote destination 30, 32, 34, 36. The wireless adapter 100 may be configured to communicate with two or more remote destinations. In this case, the wireless adapter 100 presents each remote destination to the digital camera 10 as a virtual (emulated) printer. The user sends images to a desired remote destination by "printing" to one of the emulated printers. By emulating a printer via the file transfer agent 40, the wireless adapter 100 enables digital cameras 10 without inherent networking capabilities to communicate with remote destinations.

In one embodiment, the file transfer agent 40 implements an industry standard direct printing technology, such as PictBridge®, to communicate with the digital camera 10. PictBridge® is a widely used direct printing standard administered by the Camera & Imaging Products Association (CIPA). PictBridge® provides a communication protocol architecture to enable digital cameras 10 to connect directly to a printer. This standard allows a user to print digital images directly from a digital camera 10 to a printer without having to first upload the image to a computer. In the present invention, PictBridge®, or some other direct printing technology, is used to enable direct communication between the digital camera 10 and the wireless adapter 100. Because PictBridge® is well-known in the art, further description of this technology is omitted. For more information regarding the PictBridge® technology, the interested reader is referred to the CIPA standard DC-001 describing the PictBridge® direct printing technology, which is incorporated herein by reference.

Figure 3:
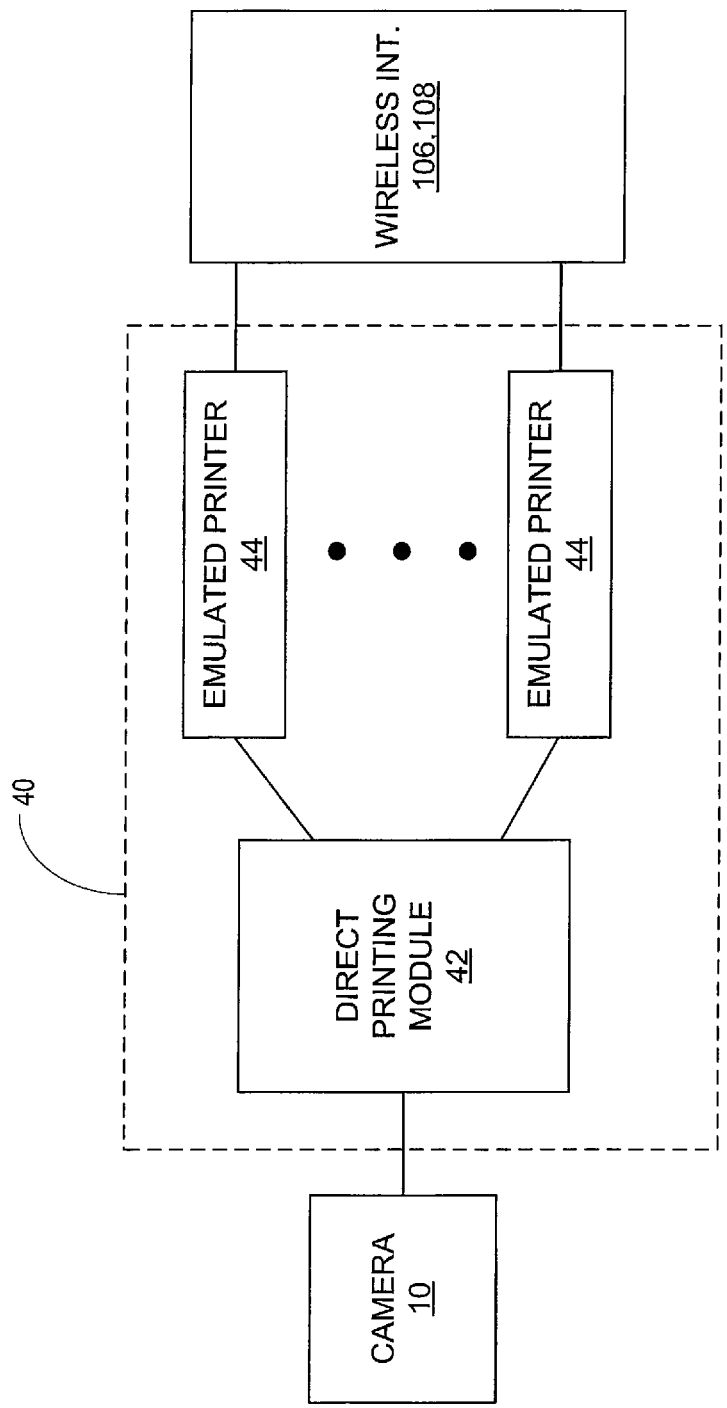
FIG. 3 is a block diagram of a printer emulator for a wireless adapter according to one exemplary embodiment.

FIG. 3 is a functional block diagram of the file transfer agent 40 according to one exemplary printer-emulation embodiment. The file transfer agent 40 includes a direct printing module 42, such as a PictBridge® module, for communicating with the digital camera 10 and one or more emulated printers 44. The emulated printers 44 function as print drivers and appear to the digital camera 10 as actual printers. In one or more embodiments, the file transfer agent 40 implements an emulated printer 44 for each remote destination to which the user of the digital camera 10 wants to send images. For example, there may be one emulated printer 44 to upload image data to a directory or application on the user's home computer 30, a second emulated printer 44 to upload image data to a web album 32 or photo library on a remote server, a third emulated printer 44 to upload image data to a web blog 34 on a remote blogging server, and a fourth emulated printer to upload image data to a remote print server 36.

To send images to a remote destination, the user selects one of these emulated printers 44 from the print menu on the digital camera 10 as if the user were going to print the image. Rather than send the image data to a printer, however, the file transfer agent 40 connects to the remote destination and transfers the image data to the remote destination via a wireless network, such as WWAN 20 and/or WLAN 22. The particulars of the image transfer (e.g., format, size, etc.) and connection management (e.g., user authentication, login, desired destination actions, etc.) are carried out in accordance with the destination parameters defined for the targeted destination.

The destination parameters and other information necessary to facilitate image data transfer over the WWAN 20 and/or WLAN 22 may be stored in memory in the wireless adaptor 100. Storing destination parameters in the memory of the wireless adapter 100 provides the user with the ability to use the wireless adaptor 100 with any digital camera 10 implementing the PictBridge® or other compatible direct printing technology.

Broadly, in one or more embodiments, the file transfer agent 40 uses the destination parameters input by the user to configure an emulated printer 44 for each destination device. The destination parameters may include, for example, the destination name and address, and authentication information such as usernames, passwords, account numbers, and public/private key information. Authentication information may be required by the selected destination device to ensure that the user of camera 10 is authorized to access and upload image data to the specified destination device. The file transfer agent 40 may also store other parameters required to connect to a selected destination device such as destination paths, upload options, specific folders or directories at the destination device that are to receive the image data, etc.

Figure 4:
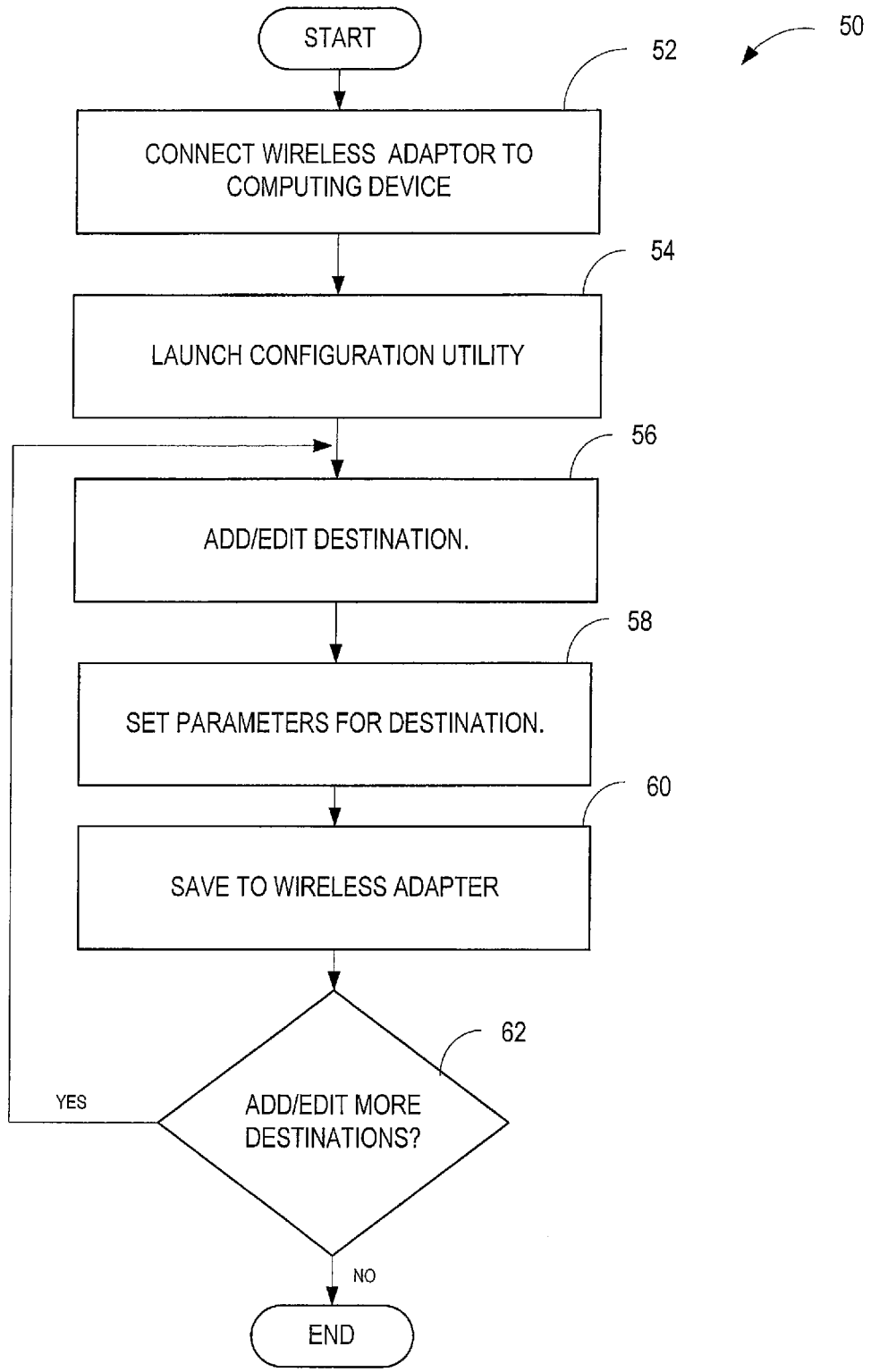
FIG. 4 is a flow diagram illustrating an exemplary procedure for configuring the wireless adaptor.

FIG. 4 illustrates one exemplary method 50 for configuring the wireless adapter 100 using a peripheral computing device such as a computer (not shown). Method 50 begins when the user connects a configuration interface of the wireless adaptor 100 to a computing device, such as a laptop computer (box 52). The camera interface 102, which may be a Universal Serial Bus (USB) port, can function as the configuration interface for use in connecting the wireless adapter 100 to the computer. The computer may automatically detect the presence of the wireless adaptor 100, as is known in the art, and launch a configuration utility (box 54). The configuration utility is a software application that enables the user to configure the wireless adapter 100. The configuration utility may include a viewer to display the configured destinations to the user. Using the configuration utility, the user may add a destination or select an existing destination for editing (box 56), and set the various destination parameters (box 58). These parameters ensure that the digital camera 10 does not require any a priori knowledge of the destination devices, the networks 20, 22, or any special ability to communicate with those devices over the wireless networks 20, 22. The user may manually enter the parameters, select the parameters from one or more pre-defined drop down lists, or both. Once the parameters have been set, the user may save the destination parameters to the wireless adaptor 100 (box 60). If the user chooses to add/edit additional destinations for storage on the wireless adaptor 100 (box 62), the user may repeat the configuration process boxes 56-60). Otherwise, the configuration process ends, and the user may disconnect the wireless adaptor 100 from the laptop computer.

Those skilled in the art will appreciate that other methods, such as over-the-air provisioning, may be used to configure the wireless adapter 100. Also, the wireless adapter 100 may include a user interface to enable the user to configure destinations without having to connect the wireless adapter to a host computer.

Figure 5:
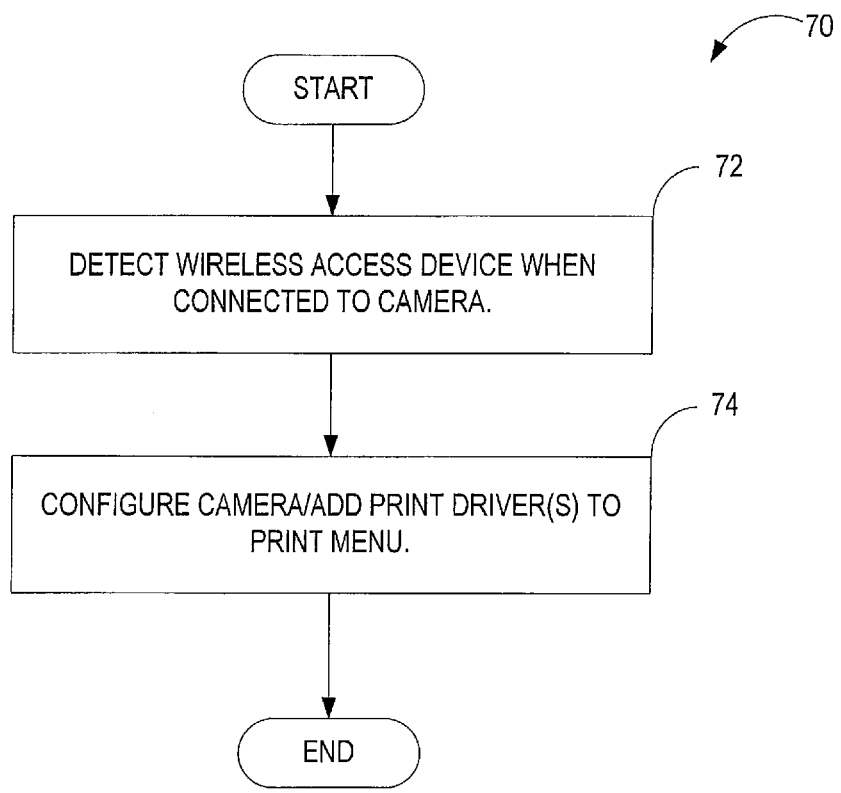
FIG. 5 is a flow chart illustrating an exemplary procedure implemented by a digital camera to add an emulated printer to a print menu.

FIG. 5 illustrates an exemplary printer configuration process 70 implemented in a digital camera 10 when the wireless adapter 100 is connected to a digital camera 10 for the first time. To use the wireless adaptor 100, the user first connects the camera interface 102 to a corresponding interface on the digital camera 10. Both interfaces may be, for example, USB ports; however, other interfaces and ports may also be suitable. Upon making the connection, the digital camera 10 detects the presence of the wireless adaptor 100 as is known in the art (box 72). As previously, noted, in one or more embodiments the wireless adapter 100 appears to the digital camera 10 as one or more printers. Upon detecting the wireless adaptor 100, the digital camera 10 adds the printers emulated by the file transfer agent 40 to the camera's print menus (box 74).

Some digital cameras 10 may have pre-defined menus related to the operation of the wireless adapter 100. In this case, the menu items may be activated or deactivated (grayed-out) the digital camera 10 depending on the presence of the wireless adapter 100. In other embodiments, menus may be stored in the wireless adapter 100 and made available to the digital camera 10 when needed using PictBridge® or other direct printing technology.

Figure 6:
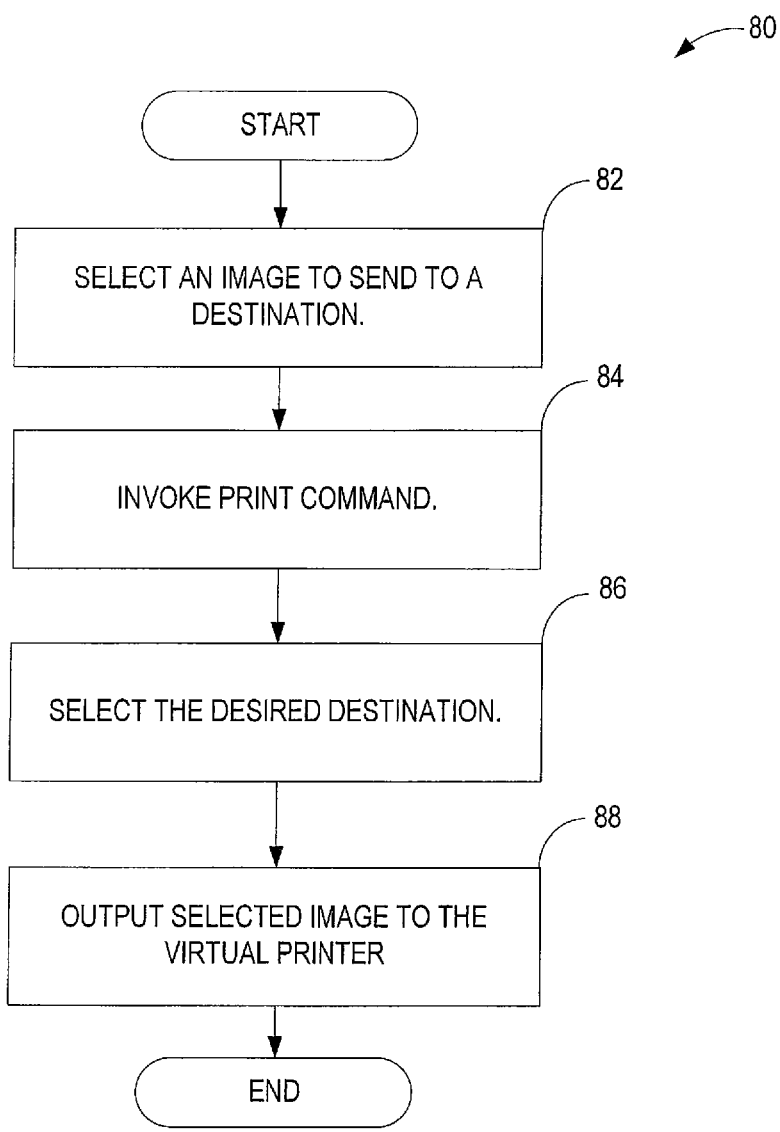
FIG. 6 is a flow chart illustrating an exemplary procedure performed by the digital camera to upload image data to a destination device using the wireless adaptor.

FIG. 6 illustrates an exemplary method 80 performed by the digital camera 10 for sending image data to a remote destination, such as the user's home computer 30. It is assumed that the user has already captured one or more digital images with digital camera 10 and stored those images in memory of digital camera 10. The user selects an image to send to the home computer 30 (box 82). Once the image is selected, the user invokes the digital camera's 10 print command (box 84). Those skilled in the art will appreciate that different digital cameras 10 will have different methods for invoking print commands. The print command may be invoked, for example, by pressing a button on a user interface of the digital camera 10, or by selecting a print option from an on-screen menu on a display of the digital camera 10. The print command may cause a menu or drop down list of available printers to appear on a display of the digital camera 10. As previously described, the remote destination will appear to the digital camera 10 as a printer. The user selects the emulated printer corresponding to the user's home computer 30 (box 86), and confirms the choice to "print" the image to the selected emulated printer. Responsive to the print command, the digital camera 10 outputs image data to the selected emulated printer 44 (box 88).

More generally, in one or more embodiments taught herein, the file transfer agent 40 emulates a printer and associates the emulated printer with a destination device, such that the wireless adaptor 100 receives image data from the digital camera 10 responsive to the digital camera 10 printing to the emulated printer. By presenting different emulated printers corresponding to different destinations, the file transfer agent 40 transfers image data to a targeted destination based on the digital camera 10 printing to a selected one of the emulated printers.

Figure 7:
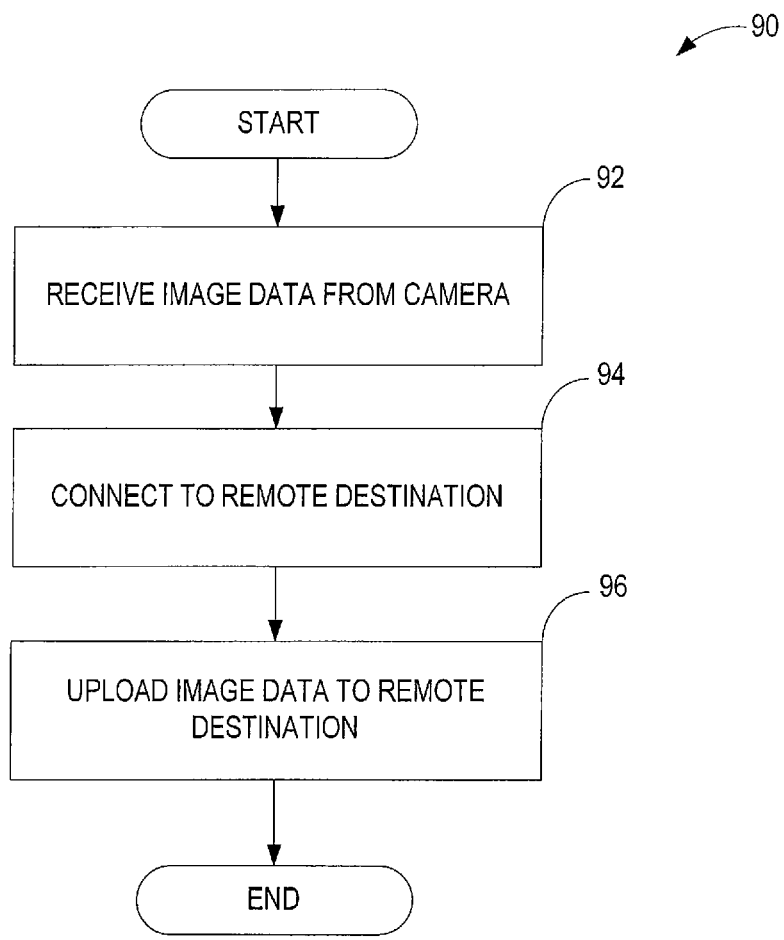
FIG. 7 is a flow chart illustrating an exemplary procedure performed by the wireless adapter to upload image data received from a digital camera to a destination device over a wireless network.

FIG. 7 illustrates a method 90 performed by the wireless adapter 100 to send image data received from the digital camera 10 to a targeted remote destination. The file transfer agent 40 receives image data from the digital camera (box 92) and transfers the received image data to the corresponding targeted destination in accordance with the stored destination parameters. In the illustrated example, the emulated printer corresponds to the user's home computer 30, which is accessible by the wireless adaptor 100 over the wireless networks 20, 22 (box 94). Thus, digital camera 10 "prints" to the emulated printer, and the wireless adaptor 100 uploads the received image data to the home computer 30 (box 96).

In general, emulated printers can be configured for a variety of destinations. Such flexibility arises from the use of configurable destination parameters, which, as explained earlier herein, may be used to determine an application, directory, or file for uploading the image. For example, the destination parameters may specify that the image data is to be stored in the "MyPictures" directory on home computer 30, which is typically associated with a specific directory path. Further, the user may have instituted various security measures on the home computer 30 to help protect against malicious access attempts. Thus, the wireless adaptor 100 might send a username/password combination to the IP address specified for the home computer 30. Additionally, the wireless adaptor 100 might authenticate itself and/or the home computer 30. If the username/password combination and/or the authentication succeeds, the wireless adaptor 100 uploads the image to the directory path associated with the "MyPictures" directory.

The procedures shown in FIGS. 6 and 7 may also be used to upload images to other destination devices, such as web album 32 or web blog 34 on a remote server, or to a remote print server 36. A web album 32 is a remote application that allows user's to store and print images. The uploaded images may be made available for viewing and printing by authorized users. The web blog 34 is an application that allows posting of images and commentary for viewing by the public. The blogging server may include a content management system (CMS) that, as is known in the art, facilitates the organization and updating of the blog 34. The remote print server 36 is a service that prints images received on photographic paper and sends the printed images to a specified address. In each instance, the destination parameters stored by the printer emulator provide information to enable connection to the destination device. The remote destination may require the user to specify a username/password combination to access the web album 32, web blog 34, or print server 36.

The previous embodiments describe the digital camera 10 as being a digital camera 10 capable of capturing still photos. However, the present invention is not so limited. In other embodiments, the wireless adaptor 100 could be connected to a video camera or other digital camera used to capture images. In still other embodiments, the present invention may comprise a device capable of capturing audio as well as images. In these cases, "printing" to a selected destination would upload the images and/or audio to the selected destination device.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A wireless adaptor for a digital camera comprising:
   a camera interface configured to interface the wireless adaptor to a digital camera;
   a wireless interface configured to interface the wireless adaptor to a wireless communication network;
   a memory circuit configured to store destination parameters; and
   a file transfer agent configured to:
      emulate a printer;
      associate the emulated printer with a destination device accessible through the wireless communication network, such that the file transfer agent transfers image data received from the digital camera to the destination device responsive to the digital camera printing to the emulated printer; and
      transfer the image data to the destination device according to destination parameters stored in the memory circuit, the destination parameters comprising preferences information identifying desired formatting or processing actions to be taken by the wireless adaptor or by the destination device with respect to the image data.

2. The wireless adaptor of claim 1, wherein the destination parameters correspond to a blog hosted on a remote server, and wherein the file transfer agent is configured to post the image data to the blog based on communicating with the remote server according to access and control information included in the destination parameters.

3. The wireless adaptor of claim 1, wherein the destination parameters correspond to a web album hosted on a remote server, and wherein the file transfer agent is configured to post the image data to the web album based on communicating with the remote server according to access and control information included in the destination parameters.

4. The wireless adaptor of claim 1, wherein the destination parameters correspond to a local computer, and wherein the file transfer agent is configured to transfer the image data to the local computer based on communicating with the local computer according to access and control information included in the destination parameters.

5. The wireless adaptor of claim 1, wherein the wireless adaptor includes a configuration interface and is configured to receive the destination parameters via the configuration interface, and store the received destination parameters in the memory circuit.

6. The wireless adaptor of claim 5, wherein the configuration interface comprises a PC-compatible interface for receiving destination parameters from an external computer.

7. The wireless adaptor of claim 5, wherein the configuration interface comprises one of the camera interface and the wireless interface.

8. The wireless adaptor of claim 1, wherein the destination parameters further comprise at least one of destination information identifying the destination device, and user information authenticating or otherwise identifying a user of the wireless adaptor to the destination device.

9. The wireless adaptor of claim 1, wherein the wireless adaptor is configured to receive and store destination parameters for a plurality of destination devices, and wherein the file transfer agent emulates a different printer for each destination device, such that the file transfer agent transfers image data from the digital camera to a selected one of the destination devices in dependence on which emulated printer is selected by the digital camera.

10. The wireless adaptor of claim 1, wherein the file transfer agent is configured as a as a direct-print device.

11. The wireless adaptor of claim 10, wherein the file transfer agent is configured as a direct-print device according to standards administered by the Camera & Imaging Products Association.

12. The wireless adaptor of claim 1, wherein the wireless adaptor is configured to receive and store destination parameters for a plurality of destination devices, and wherein the file transfer agent is configured to emulate a printer for each destination device, and to transfer the image data to a targeted destination device in dependence on which emulated printer is selected by the digital camera.

13. The wireless adaptor of claim 1, wherein the file transfer agent comprises one or more processing circuits configured to execute program instructions defining operations of the file transfer agent.

14. In a wireless adaptor configured for coupling to a digital camera, a method of supporting image transfer from the digital camera comprising:

storing destination parameters in the wireless adaptor identifying one or more destination devices accessible through a wireless communication network;

emulating a printer for each of the one or more destination devices;

associating each emulated printer with a corresponding destination device;

receiving image data from the digital camera that is targeted to a destination device; and transferring the image data to the targeted destination device according to the corresponding destination parameters responsive to the digital camera printing the image data to the emulated printer associated with the targeted destination device, the destination parameters comprising preferences information identifying desired formatting or processing actions to be taken by the wireless adaptor or by the destination device with respect to the image data.

15. The method of claim 14 wherein receiving image data from the digital camera that is targeted to a destination device includes identifying the targeted destination device based on which emulated printer is selected by the digital camera.

16. A method of uploading multimedia data from a wireless adaptor connected to a digital camera, the method comprising:

storing destination parameters associated with one or more destination devices in a memory circuit of a wireless adaptor;

communicatively connecting the wireless adaptor to a digital camera via a camera interface, and to a wireless communication network via a wireless interface;

presenting, at the wireless adaptor, a destination device as an emulated printer to the digital camera, wherein the destination device is accessed via the wireless interface;

receiving, at the wireless adaptor, image data from the digital camera over the camera interface responsive to the digital camera outputting the image data to the emulated printer; and uploading, from the wireless adaptor to the destination device over the wireless interface, the image data received from the digital camera, the destination parameters comprising preferences information identifying desired formatting or processing actions to be taken by the wireless adaptor or by the destination device with respect to the image data.

17. The method of claim 16, further comprising receiving the destination parameters over the camera interface from an external computing device.

18. The method of claim 16, further comprising receiving the destination parameters over the wireless interface.

19. The method of claim 16, wherein presenting a destination device as a printer to the digital camera comprises configuring an emulated printer for said destination based on the destination parameters.

20. The method of claim 19, wherein configuring the emulated printer comprises configuring the emulated printer to upload image data to a user's home computer.

21. The method of claim 19, wherein configuring the emulated printer comprises configuring the emulated printer to upload image data to a web album on a remote server.

22. The method of claim 19, wherein configuring the emulated printer comprises configuring the emulated printer to upload image data to a web blog on a remote server.

* * * * *